Sept. 13, 1949.  J. H. ROETHEL  2,481,535
WINDOW GUIDE MECHANISM FOR VEHICLE BODIES
Filed March 14, 1944  2 Sheets-Sheet 1
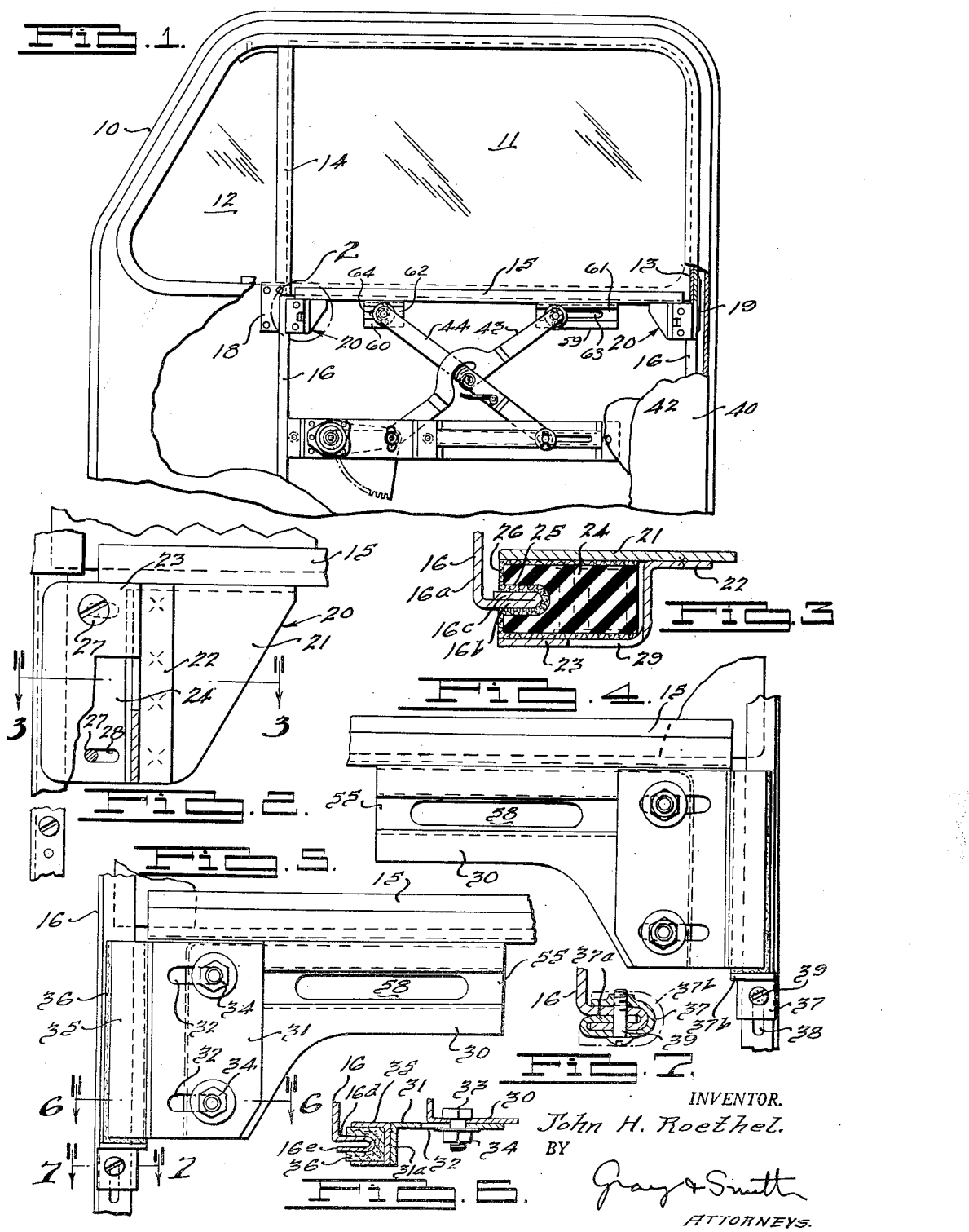
INVENTOR.
John H. Roethel.
BY
Gray & Smith
ATTORNEYS.

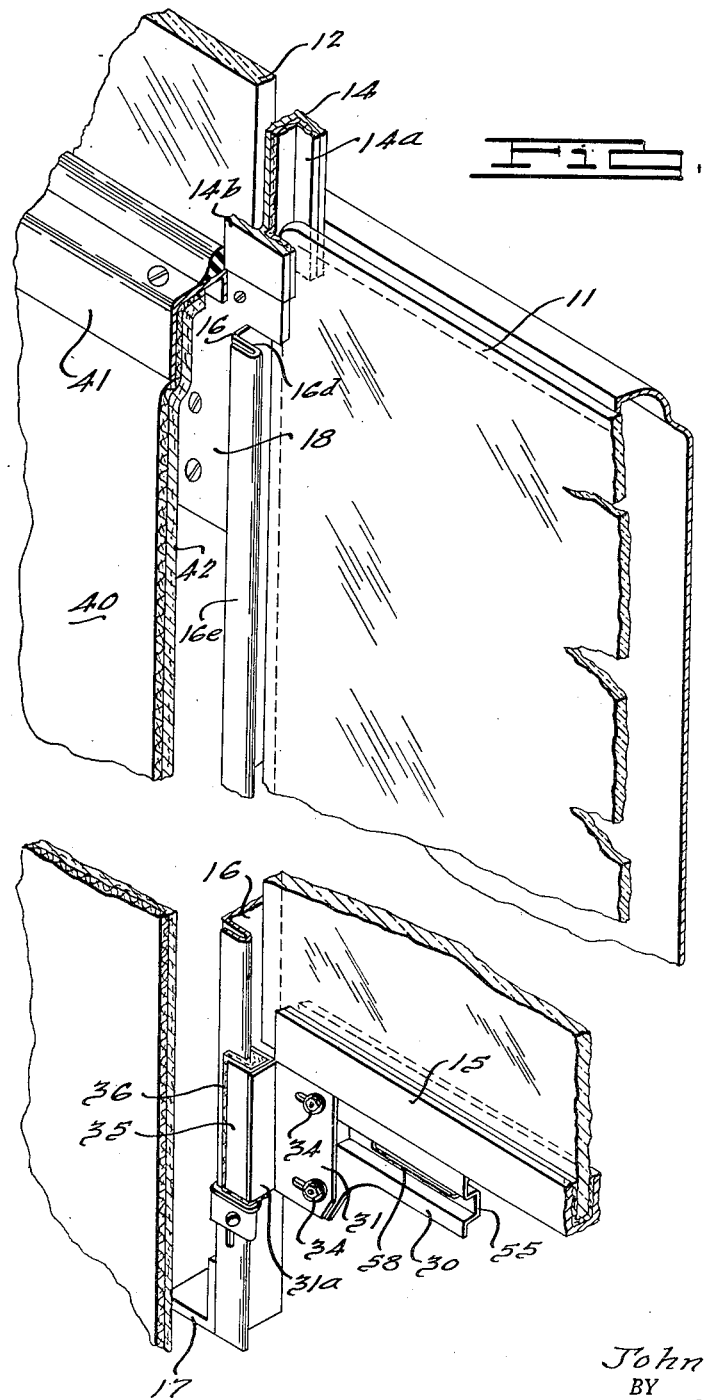

Patented Sept. 13, 1949

2,481,535

UNITED STATES PATENT OFFICE 2,481,535

WINDOW GUIDE MECHANISM FOR VEHICLE BODIES

John H. Roethel, Detroit, Mich., assignor to Marvel Equipment Corporation, Detroit, Mich., a corporation of Michigan Application March 14, 1944, Serial No. 526,450

4 Claims. (Cl. 296—44.5)

This invention relates to window control mechanism and particularly mechanism for controlling the operation of glass or transparent panels or the like of vehicles, especially automobile bodies, an object of the invention being to provide an improved mechanism which is compact, relatively simple in construction and economical to manufacture, requires a minimum of space in the body, eliminates considerable frictional resistance to the movement of the window panel, is capable of being easily assembled and adjusted properly within the body, and is adapted for use without material changes to various types of windows.

A further object of the invention is to provide a window panel control mechanism embodying improved means of simple and efficient construction for guiding the window panel within the well of a vehicle body, especially an automobile body, the improved construction being such that the panel is guided with a minimum of frictional resistance to its travel while the guide means in the well is substantially noiseless or constructed in such manner as to avoid chattering or vibrating noises during operation of the vehicle and at the same time is easy to install and adjust for efficient operation.

Another object of the invention is to provide an improved window guide mechanism embodying fixed upright guides within the window well each formed of an angle having a single guide flange extending longitudinally within the well and adapted to be engaged by a guide device secured to the lower edge of the window panel, such as a member grooved to embrace the guide flange and capable of being maintained at all times in proper guiding relation to the flange.

Still a further object of the invention is to provide improved guide means for a window panel embodying depending guide shoes or members positioned so as to slidingly embrace upright guide members adjacent opposite edges of the panel, the guide shoes or either of them being so mounted as to permit shifting thereof into position away from the respective guide member so as to preclude interference therewith when the panel is installed in the window well, the improved construction enabling the shoe to be adjusted into proper guiding relation to the guide member after such installation and each shoe being constructed in improved manner to minimize friction and avoid objectionable noise, chattering or rattling as a result of vibrations set up during operation of the vehicle.

Another object of the invention is to provide an improved window regulator mechanism embodying a unitary cross arm and mounting plate construction providing a compact, relatively cheap and easy to be installed structure.

Still another object of the invention is to provide a window regulator having improved means for connecting the same to the mounting plate as well as the glass retainer member at the lower edge of the window panel.

A further object of the invention is to provide a cross arm regulator having improved remote control mechanism for operating the same.

Other objects of this invention will appear in the following description and appended claims, reference being had to the accompanying drawings forming a part of this specification wherein like reference characters designate corresponding parts in the several views.

Fig. 1 is a fragmentary inner side elevation of an automobile door, such as a front door, having installed therein a window control mechanism embodying the present invention.

Fig. 2 is an enlarged fragmentary view of the structure embraced within the circle 2 in Fig. 1.

Fig. 3 is a section taken substantially through lines 3—3 of Fig. 2 looking in the direction of the arrows.

Fig. 4 is an enlarged fragmentary view of another form of guide structure mounted at one end of the window panel.

Fig. 5 is a view similar to Fig. 4 illustrating the guide structure at the opposite end of the window panel.

Fig. 6 is a section taken substantially through lines 6—6 of Fig. 5 looking in the direction of the arrows.

Fig. 7 is a section taken substantially through lines 7—7 of Fig. 5 looking in the direction of the arrows.

Fig. 8 is an enlarged fragmentary perspective view illustrating the installation within a door similar to that shown in Fig. 1 of the sliding window panel and the guide structure constructed in accordance with the embodiment of Figs. 4 to 7 inclusive.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings wherein I have illustrated, by way of example, certain embodiments of the present invention, there is shown at 10 a front door of an automobile body comprising a door frame of any suitable construction formed with a main window opening which is adapted to be closed by means of a vertically slidable glass or other transparent panel 11. In the present instance the door frame is constructed so as to receive in the main window opening a wing type panel 12 pivoted in conventional manner about an up and down axis intermediate its front and rear edges so as to swing laterally. It will be understood that the present invention may be utilized in connection with any of the windows of an automobile body and, in addition, may be used generally with various window structures of vehicles or the like.

The sliding panel 11 is mounted within the window opening in glass run channels 13. The panels 11 and 12 are separated by means of a vertical partition bar 14 which either may be fixed within the window opening, as in the present instance, or attached to the edge of the panel 11 to slide therewith.

Secured to the lower edge of the sliding panel 11 is a retainer channel 15 to which the window regulator is adapted to be attached. Mounted within the window well of the door, which is formed between the inner and outer door or body panels, are two fixed upright guides 16, each being secured at its lower end within the well by a bracket 17 secured to the inner door panel (Fig. 8). The upper end of the front guide 16 is attached to a fixed bracket 18 and the upper end of the rear guide 16 is attached to a fixed bracket 19.

Referring to Figs. 1 to 3 inclusive, the window panel 11 is provided with front and rear guide devices generally indicated at 20 cooperable with the upright guides 16 within the window well. Since these guide devices are identical in construction, one thereof, namely, the front guide device will be described in connection with Figs. 2 and 3. Each of the guides 16, which cooperates with one of the guide devices 20, comprises a metal angle having a base 16a and an inwardly or longitudinally extending guide flange 16b which is folded or turned back upon itself to provide a parallel portion 16c. This construction provides a track portion of two thicknesses of metal terminating in a rounded guide edge.

Each guide device 20 comprises an angle bracket 21 flanged at its upper edge and secured, as by spot welding, to the bottom of the channel 15. Secured, as by spot welding, to the face of each bracket 21 is a metal piece or bracket 22 which is bent at right angles to the bracket 21 and thence extended at 23 parallel to the bracket 21 to provide a vertical channel section or recess within which is inserted a block or shoe 24 which may be of rubber or fiber material or other preferably non-metallic material. Each guide block or shoe 24 is formed with a channel or vertical U-shaped groove 25 at its outer edge adapted to receive the turned edge of the guide flange 16b. Extending around three sides of the block or shoe 24 is a facing 26 of fabric, felt or other similar relatively soft anti-friction material, this material entirely lining the groove 25 and preferably having a nap or pile within the groove where contact is made with the metal flange portions 16b and 16c so that a small effective area of the guide shoe will be in frictional engagement with the flanged track of the guide member 16. It is preferred that the guide flange be of two thicknesses of metal preferably at least to the depth of the guide groove or channel 25.

The guide block or shoe 24 has two vertically spaced transverse slots 28 through each of which extends a bolt 27. The angle piece 22 also has a slot 29 in its wall 23 through which may be inserted a tool, such as a screw driver. By this construction the block or shoe 24 may be adjusted toward or from the guide flange 16b in order to provide a relatively snug or loose fit of the guide flange within the guide groove or channel 25. This adjustment is accomplished by loosening the bolts or screws 27, which normally clamp the walls 21 and 23 tightly against the shoe, and then inserting a tool through the slot 29 behind the block or shoe 24 and prying or shifting the block forwardly. When such adjustment has been made the bolts 27 may be tightened to clamp the block in fixed position. With this construction it is, therefore, possible to properly position the guide blocks or shoes with respect to the guides at the initial assembly or at any time in order to take up wear or misalignment of the parts.

Referring to Figs. 4 to 7 inclusive and 8, there is illustrated in these views front and rear guide devices for the window panel 11 which may be substituted for those illustrated in Figs. 2 and 3. Fig. 4 illustrates the guide means adjacent the rear edge of the panel 11 and Fig. 5 illustrates the guide means adjacent the front edge of the window panel.

Each of the guide devices adapted to be mounted at the front and rear edges of the window panel is preferably identical in construction, and, as illustrated in Figs. 4 to 6 inclusive, comprises an angle bracket 30 terminating at its upper edge in a laterally extending flange underlying the retainer channel 15 and spot welded thereto. Mounted against the end face of the bracket 30 for adjustment thereon is an angle bracket 31 terminating in an inwardly extending flange 31a. The bracket 31 is provided with two vertically spaced horizontal slots 32 through which extend the shanks of bolts or studs 33 extending through holes in the bracket 30, there being nuts 34 threaded onto the bolts or studs and adapted to be tightened to clamp them in fixed adjusted positions within the adjusting slots 32. To the outer face of the flange 31a is spot welded a channel shaped member or shoe 35, and fitting into the channel of this shoe or member is a channel shaped or vertically grooved liner 36 which is preferably of felt-like material or pile fabric or other similar relatively soft anti-friction material similar to the material 26. The groove or channel in this insert or liner 36 is adapted to receive the inwardly extending guide flange of the guide member 16.

As illustrated particularly in Figs. 6 and 8, each guide 16 comprises a base terminating in an inwardly or longitudinally extending flange 16d the metal of which is folded or turned back upon itself to provide a second and parallel flange 16e, these two flanges being joined by a rounded edge of increased radius. The depth of these flanges is preferably greater or at least as great as the depth of the groove or channel in the anti-friction liner 36. As a result of this construction there is provided a guide track cooperable with the guide shoe having an effective thickness greater than twice the thickness of the metal and having a rounded edge of sufficient radius to reduce wear on the material 36 at the bottom of the groove therein. In addition, the spacing of the flange portions 16d and 16e permits some compressibility of the sides of the track so as to assist in accommodating or compensating for misalignment of the guide shoe and guide as a result of production inaccuracies.

It is important to note that the length of the slots 32 is sufficient to permit the bracket 31, after loosening nuts 34, to be shifted away from the guide 16 to back the shoe 35 off the guide flanges 16d and 16e so that the latter will be entirely out of the groove in the liner 36. This construction facilitates installation of the window panel as later described.

As illustrated in Figs. 4, 5, 7 and 8, there is provided an adjustable stop at the lower end of each guide 16 cooperable with the shoe 35 to stop downward movement of the window panel at its lower limit. Each stop comprises a metal piece 37 bent into channel shape to embrace the flanges 16d and 16e and having a portion 37a extending into the space between these flanges. These flanges are provided with aligned vertical slots 38 and a screw 39 extending through aligned holes in the channel piece 37 and also through the aligned slots 38. By loosening the screw the stop piece 37 may be adjusted along the length of the slot 38 to proper position and then fixed in place by tightening the screw. The upper edge of the stop piece 37 is turned out to provide a marginal flange 37b of greater thickness than the felt liner 36 so as to be engaged by the metal ends of the shoe 35 when the window is lowered to its bottom limit within the window well.

In the embodiment illustrated in Figs. 4, 5 and 8 each bracket 30 is constructed for attachment thereto of the outer end of the swinging arm of a window regulator, such as a conventional cross arm regulator having swinging arms 43 and 44. As illustrated in these views, each bracket has an extended portion pressed or stamped to provide an outwardly extending channel 55 with a guide slot 58 punched through the bottom of this channel. This channel and guide slot in each bracket 30 provides a means for connection thereto of a connector on the outer end of a window regulator arm. Similarly the regulator arms 43 and 44 may be connected respectively, to brackets 59 and 60 having channels 61 and 62 provided with guide slots 63 and 64, respectively, similar to the channels and slots 55 and 58.

Fig. 8 illustrates a suitable assembly of the guide structure within the automobile door shown in Fig. 1 utilizing, for example, guide devices of the construction illustrated in Figs. 4 to 6 inclusive. The fixed guide bar 14 is of channel construction providing a vertical groove or glass run for the front edge of the window panel, this groove having a liner 14a of felt or other equivalent pile or relatively soft material so as to cooperate with the rear glass run channel 13 in guiding the window panel within the window opening. The guide 16 is mounted within the window well in such manner that the guide flange portion 16d, 16e is offset laterally with respect to the guide 14 so that the adjacent upright edge of the window panel 11 will overlap but travel to one side of the flange 16d without enagement therewith in any position of the window panel. The flange 31a of the bracket 31 offsets the guide shoe 35 laterally so as to position it laterally with respect to the plane of the window panel. A similar construction is provided at the rear end of the window panel in respect to the opposite guide device. In Fig. 8 the inner trim panel is shown at 40 and the usual garnish molding at 41. The trim panel and garnish molding overlie and are secured to the inner metal door panel 42 which extends between and is welded to the opposite upright pillars of the door frame.

It is important to note that the construction of the guide devices in the embodiment of Figs. 4 to 7 inclusive and 8 enables the window panel 11 to be installed through the upper end of the window well by tilting the window panel and shifting it downwardly through the narrow slot along the window sill between the upper edges of the inner and outer door panels. In installing the window panel in this manner the nuts 34 are loosened and the bracket 31 is shifted back away from the guide 16. The window panel may then be tilted and inserted into the well into position such as shown in Fig. 8. Thereupon the brackets 31 are shifted outwardly to cause the guide shoes 35 to embrace the guide flange. When properly adjusted the nuts 34 are tightened thereby clamping the guide devices in proper positions as illustrated in Figs. 4, 5 and 8. It will be understood that the adjusting slots 32 are not only sufficiently long to permit the guide shoes to be backed clear off of the guide flanges of the guides 16 but also to be adjusted to increased depth with respect to the guide flanges so as to take up or compensate for wear after continued use.

I claim:

1. In a window guide structure for a window panel shiftable up and down within a window well within which is mounted an upright guide, said window panel having a channel embracing the lower edge thereof, a bracket rigidly secured to said channel and depending therefrom, a second bracket having a vertical portion engaging a vertical side of said first bracket and slidable thereon, a channel shaped guide shoe portion on said bracket, and connecting means extending transversely of the window panel between said vertical portion and vertical side permitting adjusting movement of the second bracket and guide shoe portion in a generally longitudinal direction toward and from said guide, said connecting means comprising vertically spaced bolts extending through longitudinal slots in said second bracket, the slots being longer than the depth of the channel in said guide shoe portion whereby said second bracket is adjustable to disengage said guide shoe portion from said upright guide.

2. In a window guide structure for a window panel shiftable up and down within a window well having a fixed upright guide mounted therein, a bracket secured to a member on the lower edge of the panel, guide shoe means including a channel shaped portion, and vertically spaced devices extending transversely of the window panel and connecting a vertical portion of said guide shoe means with a vertical portion of said bracket and constructed to permit adjustment of said guide shoe means in a longitudinal direction toward said upright guide into fixed position to cause said channel shaped portion to receive said guide and also to permit retraction of said guide shoe means into position to disengage said channel shaped portion from said guide, said devices comprising bolts extending through longitudinal horizontal slots in said vertical portion of the guide shoe means, the slots being longer than the channel in said channel shaped portion.

3. A guide structure for use with a window panel shiftable up and down within a window well within which is mounted an upright guide, comprising a channel adapted to be secured to the lower edge of the panel, a bracket rigidly secured to an end of said channel and depending therefrom, a second bracket having a vertical portion engaging a vertical side of said first bracket and slidable thereon, a channel shaped guide device carried by said second bracket, and connecting means extending transversely of the window panel between said vertical portion and vertical side permitting adjusting movement of the second bracket and guide device in a generally longitudinal direction toward and from said upright guide, said connecting means comprising vertically spaced threaded elements carried by one bracket and extending through longitudinal slots in the other bracket, the slots being longer than the effective depth of the channel in said guide device whereby said second bracket is adjustable to disengage said guide device from said upright guide.

4. A guide structure for use with a window panel shiftable up and down within a window well within which is mounted an upright guide, comprising a channel adapted to be secured to the lower edge of the panel, a bracket member secured to said channel and depending therefrom, a guide member including a channel shaped portion, and means for connecting said members together to permit adjustment of said guide member in a longitudinal direction toward said upright guide into fixed position to cause said channel shaped portion to receive said guide and also to permit retraction of said guide member into position to disengage said channel shaped portion from said guide, said means comprising spaced threaded elements carried by one of said members extending through longitudinal generally horizontal slots in the other of said members, the slots being longer than the effective depth of the channel shaped portion of said guide member.

JOHN H. ROETHEL.

REFERENCES CITED

The following references are of record in the file of this patent:

UNITED STATES PATENTS

| Number | Name | Date |
| --- | --- | --- |
| 1,689,132 | Haarnagell | Oct. 23, 1928 |
| 1,713,088 | Nicholson | May 14, 1929 |
| 1,907,799 | Hardtke | May 9, 1933 |
| 1,913,583 | Carr | June 13, 1933 |
| 1,990,220 | Ball | Feb. 3, 1935 |
| 2,059,027 | Potter | Oct. 27, 1936 |
| 2,081,896 | Axe | June 1, 1937 |
| 2,283,002 | Floraday | May 12, 1942 |
| 2,304,640 | Joachim | Dec. 8, 1942 |
| 2,379,924 | Roethel | July 10, 1945 |

FOREIGN PATENTS

| Number | Country | Date |
| --- | --- | --- |
| 513,758 | Great Britain | Oct. 20, 1939 |